April 19, 1960 W. A. WOOTTEN 2,933,555
SYSTEM FOR MODULATING A MAGNETIC FIELD
FOR ELECTRICAL REPRODUCTION
Filed Feb. 9, 1953 3 Sheets-Sheet 1

INVENTOR.
WILLIAM A. WOOTTEN
BY [signature]
Attorney

April 19, 1960 W. A. WOOTTEN 2,933,555

SYSTEM FOR MODULATING A MAGNETIC FIELD FOR ELECTRICAL REPRODUCTION

Filed Feb. 9, 1953 3 Sheets-Sheet 2

INVENTOR.
WILLIAM A. WOOTTEN
BY [signature]
Attorney

April 19, 1960 W. A. WOOTTEN 2,933,555

SYSTEM FOR MODULATING A MAGNETIC FIELD FOR ELECTRICAL REPRODUCTION

Filed Feb. 9, 1953 3 Sheets-Sheet 3

INVENTOR.
WILLIAM A. WOOTTEN
BY
Attorney 2,933,555

SYSTEM FOR MODULATING A MAGNETIC FIELD FOR ELECTRICAL REPRODUCTION

William A. Wootten, Los Angeles, Calif.

Application February 9, 1953, Serial No. 335,731

13 Claims. (Cl. 178—6.6)

This invention relates to novel methods and apparatus for modulating magnetic fields and more particularly to novel systems employing such modulated magnetic fields for recording and reproducing electrical signals. The invention is more especially directed to a novel method and apparatus for recording a television program on a magnetic tape, and for the purposes of setting forth the basic principles underlying the invention, the method and apparatus will be described in this connection. It is to be understood, however, that the invention is by no means so limited.

It is well known that forces on current carrying conductors are exerted when such conductors are placed in a given magnetic field. This principle is well exemplified, for example, in the conventional electric motor. A thorough analysis of the exact nature of these forces has led to the conclusion that the magnetic field set up about a current carrying conductor interferes with the given magnetic field to cause either an augmentation or reduction in the net resulting field strength. In the case of the circular magnetic field set up about a current carrying conductor, the field on one side of the conductor will augment the given field while the field on the other side will reduce or even cancel the given field, the resulting unbalance in the net field presumably resulting in a "force" on the conductor.

The theory has been extended to moving electrical charges in vacuums wherein the magnetic field set up about a beam of such charges will interfere with fixed magnetic fields adjacent said beam to cause deflection of the beam. This principle is exemplified in the magnetic deflection and focusing systems employed in some cathode ray tubes.

Heretofore, the above noted principles have been utilized mainly for deflecting or focusing beams of electrical charges or for causing groups or even single charges to follow given paths. Little attention has been paid to the magnetic field, characteristic of the moving charge, and its effect on the given, principal magnetic field to which it is exposed.

The present invention has to do with certain methods and apparatus employing the net resultant field patterns established due to movement of electrical charges through a given magnetic field.

A primary object of the invention is to provide novel methods and apparatus for modulating a magnetic field by augmenting and/or reducing the magnetic flux of said field by a beam of electrical charges.

Another object is to provide a novel method and apparatus for reproducing an electrical signal through the medium of a modulated magnetic field.

A particular object of the invention is to provide a novel method and apparatus for recording a television program on a magnetic tape and a novel method and apparatus for reproducing said program from said tape.

These and other objects of the invention are attained by providing, in general, a given magnetic field and then passing a stream or beam of electrical charges through said field. This beam of charges may be modulated in either density or velocity by a signal, to provide a modulated magnetic field about the beam. This second magnetic field will interfere with the given magnetic field to result in a net modulated magnetic field which may be suitably transduced to provide a signal varying in accordance with the modulating signal; or the modulated magnetic field may be recorded directly on a magnetic wire or tape.

A clearer understanding of the invention will be had by referring to the accompanying drawings in which:

Fig. 1 is a diagram showing a given magnetic force field and the effect on the flux lines of this field due to moving electrical charges;

Fig. 2 schematically illustrates an apparatus for detecting changes in a magnetic field brought about in accordance with the principles shown in Fig. 1;

Figure 1:
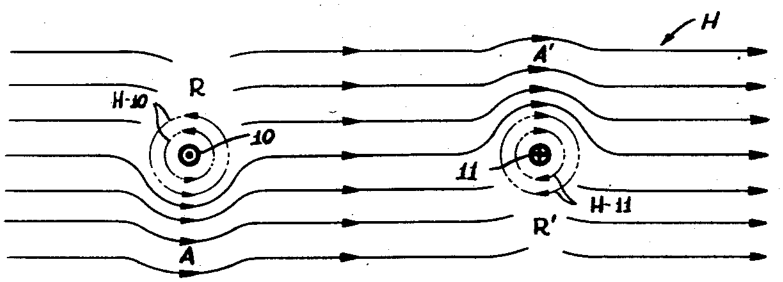

In Fig. 1 there is shown a uniform magnetic field H represented by a series of parallel flux lines extending from left to right as indicated by the arrows. Consider a beam of electrical charges passing through the field H in a direction normal to the plane of the drawing, that is, into the paper as indicated at 10. If this beam of electrical charges is effected by means of a current carrying conductor, then the conventional direction of the current would be opposite to the charge flow and would be coming out of the paper. The magnetic field set up about these moving electrical charges takes the form of concentric circular lines of flux as indicated at H–10. The direction of these circular flux lines is counter clockwise when the charges are considered as passing into the paper (or current coming out of the paper) as shown.

It will be noted that the given field H is pushed or crowded below the conductor or beam 10 whereas it will be diminished or substantially canceled above the beam 10 due to the direction of the circular magnetic flux lines about the beam or conductor 10. This crowding of the magnetic field below the conductor 10 is indicated at A while the reduction or cancellation of the magnetic field above the conductor is indicated at R. This net field unbalance results normally in a force tending to move the conductor or deflect the beam of electrical charges 10 upwardly towards the reduced portion R.

Similarly if a beam of electrical charges is directed out of the paper, or an electric current is passing into the paper as indicated at 11, the circular magnetic flux lines H–11 about the conductor or beam 11 are clockwise and there will be an augmentation or crowding of the resultant magnetic lines of force above the beam 11 as indicated at A′, and a corresponding reduction below the beam 11 as indicated at R′. In this instance, the net unbalance in the magnetic field will tend to exert a downward force on the beam or conductor 11.

Now if the beam of electrical charges or current through the field H, as indicated at 10 and 11 in Fig. 1, is such as to resist substantially the forces exerted thereon, the net resultant magnetic field lines will be distorted substantially as shown. It will also be noted that a variation in the field strength in either of the fields H–10 or H–11 will result in a net variation in the total field strength at the points A and R.

Figure 2:
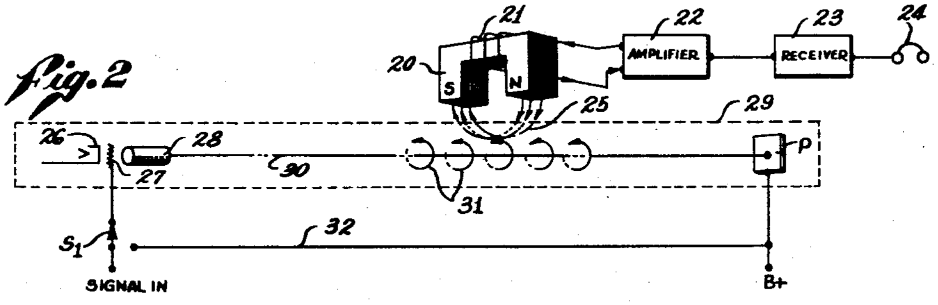

Fig. 2 discloses schematically a simple apparatus employing the above outlined principles for reproducing an electrical signal. This system may comprise, for example, a permanent magnet 20 composed of a high permeability magnetic flux carrier, about which a conductor 21 is wound in a series of coils and connected through an amplifier 22, receiver 23, and to an audio reproducing means such as earphones 24. The magnet 20 provides a field of flux lines 25 extending from the north pole N to the south pole S as shown.

An electron gun is provided for directing a beam of electrical charges such as a cathode ray, through the field 25. Such gun may include for example a cathode 26, grid 27, accelerating electrode 28 and a plate or anode P on which a high potential B+ is impressed. The principles of construction of such an electron gun are well known and it is not thought that it need be described in detail here. The electron gun system is generally enclosed in a glass tube 29 as indicated by the dashed lines and a high vacuum maintained in the tube. The beam of moving electrical charges 30 sets up a magnetic field about itself as indicated by the arrows 31. It will be noted that this beam 30 is so directed as to pass close to the flux lines 25 from the magnet 20, and the flux lines 31 about beam 30 will therefore interfere with the flux lines 25 tending to augment the field strength existing between the north and south poles of the magnet 20. There will also be a reduction of the net field strength at the lower side of the beam 30 since the circular magnetic flux lines 31 will be travelling in the other direction; however, this diminutive effect is not as great as the augmentation since the lower part of the beam is further away from the poles of magnet 20. The interference of the two magnetic fields 31 and 25 normally causes the beam 30 to be deflected downwardly. This interference also results, however, in a change in the flux through the magnet 20.

Suppose now an electrical signal is fed onto the grid 27 of the electron gun. Since the fixed high potential B+ is applied to the plate P, the electrons that get past the grid 27 will all travel at the same speed towards the plate. The effect of an electrical signal on the grid 27 is to gate the number of electrons per unit time passing through the grid in accordance with the variations in the input grid signal. Thus there is a density modulation of the beam, and inasmuch as the intensity of the magnetic field 31 about the beam is proportional to the charge strength or number of charges moving, this magnetic field will also be modulated in strength in accordance with the input signal. The modulated field 31 thus interferes with the field 25 of the magnet 20 and provides a net modulated magnetic field flux in the magnet 20. This changing flux or modulated field will induce currents in the coil 21 which currents may be suitably amplified by the amplifier 22, detected in the receiver 23, and audibly reproduced, for example, by earphones 24.

It will be seen accordingly, that the apparatus of Fig. 2 provides a method for reproducing an electrical signal through the medium of a modulated magnetic field.

It is also possible in the apparatus of Fig. 2, to modulate the velocity rather than the density of the charges in beam 30 and thereby effect modulation of the net magnetic field. This may be accomplished, for example, by applying the electrical signal to the accelerating plate P as by means of the switch $S_1$. Moving the switch $S_1$ to contact the conductor 32 opens the circuit to the grid 27 and results in a uniform emission of charges. The signal however is now applied to plate P and serves to modulate the accelerating potential for the charges and thus velocity modulate the beam 30. Since the magnetic field about a moving charge is proportional to the velocity at which the charge is moving, the magnetic field 31 is also modulated.

Figure 3:
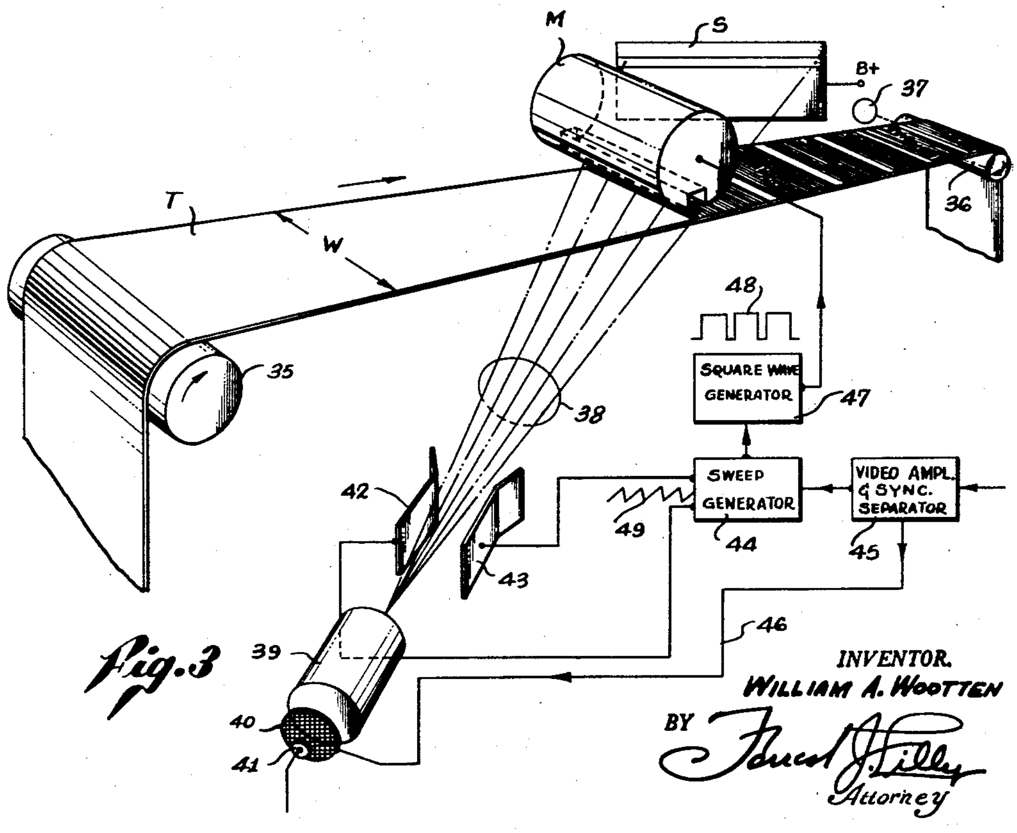
Fig. 3 is a schematic perspective view and block diagram of a system for recording electrical signals on a magnetic tape in accordance with the invention.

Fig. 3 shows schematically, in perspective, a novel electron gun employing the principles illustrated in Figs. 1 and 2, for recording a television program, for example, on a magnetic tape. The usual evacuated envelope for the electron gun, which may be of glass or metal suitably shaped to house the elements thereof, is omitted in order to reveal the internal structure of the tube and thereby simplify the drawing.

As shown in Fig. 3, there is provided a tape T which is capable of retaining the characteristics of a magnetic field to which it is exposed. Such tape is well known in the art and generally comprises a carrier of cellulose acetate incorporating magnetizable particles and coated with a suitable metallic oxide. The specific type of tape for recording television programs in accordance with the present invention has a special width W of about 1¾ in. which may be different however depending on the fidelity of reproduction desired.

The film T is passed over two stabilized drums 35 and 36, the drum 36 being driven by a suitable synchronous motor 37 in a clockwise direction as shown, to move the tape in the direction indicated by the arrow. Disposed transversely of the tape is a recording head M adapted to expose the tape T to a magnetic flux field. A beam of electrical charges 38 is passed between the recording head M and the tape T by means of an electron gun comprising an accelerating and focusing electrode 39 preceded by a suitable grid 40 and conventional cathode element 41. The focusing electrode 39 causes the beam to pass between the magnetic recording head M and the tape T to a screen S which may have impressed upon it a high voltage B+.

The beam 38 is arranged to be swept horizontally across the width of the tape T by means of horizontal deflection plates 42 and 43 connected to a sweep generator 44 in turn fed by a synchronizing signal from a video amplifier and synchronizing separator 45 as shown. In recording a television program the various synchronizing signals and video signals are impressed on the input of the video amplifier and synchronizing separator 45. The signal from unit 45 comprising the video signal is passed through a conductor 46 to the grid 40 of the electron gun.

A synchronizing signal from the sweep generator is also passed to a square wave generator 47, the output of generator 47 passing up to the magnetic recording head M. This output square wave is diagrammatically illustrated at 48. The conventional sawtooth sweep to the horizontal deflection plates 42 and 43 is also diagrammatically illustrated as at 49.

Figure 4:
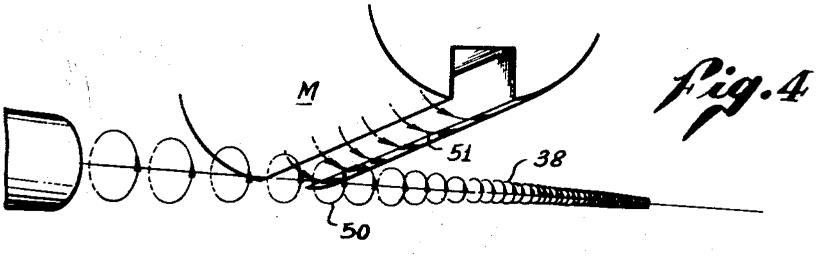
Fig. 4 is an enlarged perspective view showing the lines of force characterizing the magnetic field employed in the embodiment shown in Fig. 3.
Figures 5, 6:
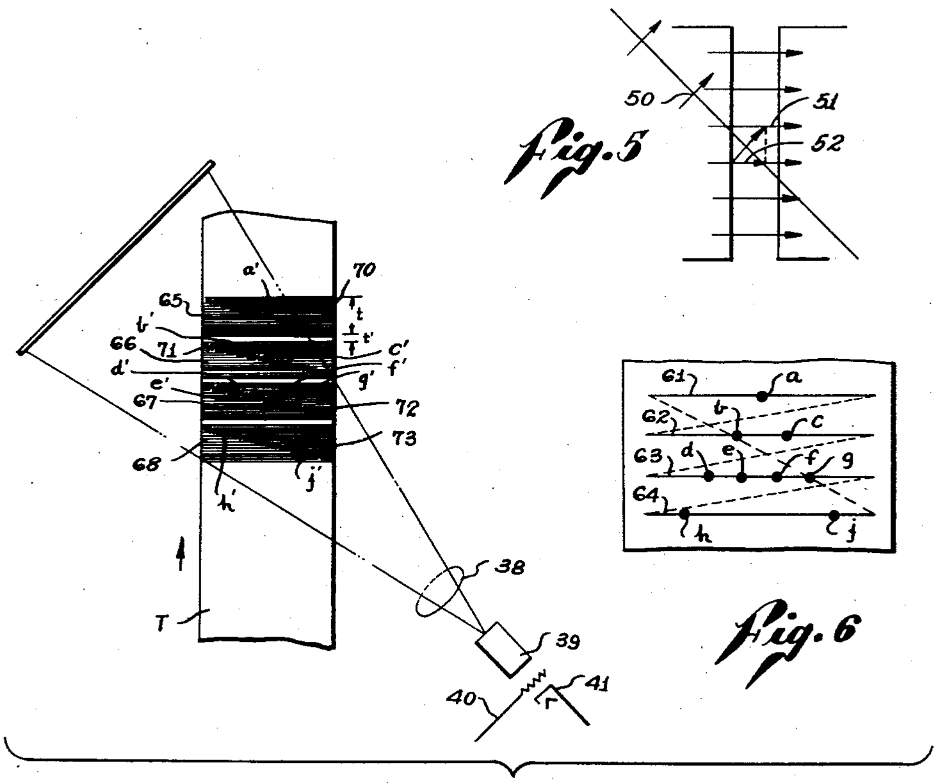
Fig. 5 shows in greater detail the direction of the magnetic field flux lines as seen looking up at the enlarged view of Fig. 4 from below.
Fig. 6 is a schematic diagram useful in explaining the operation of the apparatus of Fig. 3 for recording a television program on a magnetic tape.

Referring to Figs. 4 and 5 it will be seen that the stream or beam of electrical charges 38 creates a magnetic field 50 as indicated by the circles and arrows about the beam 38. The flux field set up by the recording head M is indicated by arrows 51 passing from left to right as shown. As the electron beam 38 is caused to sweep under the recording head M, it will be seen that the circular magnetic field 50 will interfere with the magnetic field 51 to either augment or reduce the intensity of this field.

As shown in Fig. 3, the electron gun is arranged to direct the beam at an angle to the moving tape T. This is done in order that the beam may be swept across the width of the tape and at the same time to permit a component of the magnetic field set up about the beam 38 to be parallel to the magnetic field 51 of the recording head M. Thus, as shown in Fig. 5, the beam magnetic field 50 is at an angle to the magnetic field lines 51 so that a component, as represented by the arrow 52 in Fig. 5, is in the direction of the flux lines 51. It will be appreciated that were the electron beam directed normally to the head M, that is, in the same direction as the tape T, there would not be interference between the respective magnetic fields since the field directions would be at right angles to each other. On the other hand if the electron beam were directed parallel to the recording head, that is, transverse or perpendicular to the longitudinal direction of the tape, the respective fields would be parallel but it would not be possible to sweep the beam across the width of the tape.

Figure 7:
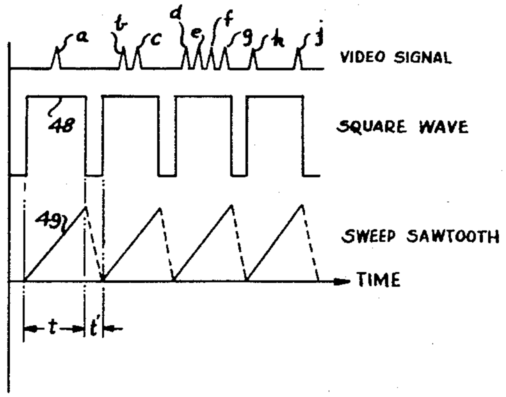
Fig. 7 shows various wave forms employed in the apparatus of Figs. 3 and 6.

In describing the operation of the system of Fig. 3, reference will now be had to Figs. 6 and 7. Consider first the usual procedure for televising a program. Normally the scene to be televised is projected as an image on a photo-sensitive screen. This screen is then scanned by a suitable electron beam there being approximately 262½ scan lines covering the image each sixtieth of a second and a second group of 262½ scan lines interlaced with the first group to provide a total number of 525 individual scans each thirtieth of a second. The 525 scans are interlaced to provide a uniformity in illumination for each frame in subsequent reproduction of the televised picture.

In Fig. 6, for the sake of simplicity, there is represented a scanning frame comprised of four scan lines 61, 62, 63 and 64. In the televising instrument, this scanning is effected generally by a sweep sawtooth wave such as 49 in Fig. 7 and the beam commences at the upper lefthand corner of the frame shown in Fig. 6, sweeps to the right, being blanked during the flyback time as indicated by the dotted line, and commences the second sweep to form the line 62 at a position spaced below the scan line 61. This process continues until the lower righthand portion of the frame is reached at which time the beam is then deflected up to the upper lefthand corner to commence a new frame. In Fig. 7 the time for one scan from left to right is indicated by *t* and the flyback time represented by *t'*. As previously stated, under normal operating conditions there are 262½ such scanning lines executed each sixtieth of a second and another 262½ the next succeeding sixtieth of a second, the second group of scan lines being interlaced between the first group to result in a total of 525 scan lines each thirtieth of a second.

Referring again to Fig. 3, in recording this televised program on tape, the synchronizing pulse for the sweep generator is fed into the square wave generator 47 which produces a square wave 48 for actuating the magnetic recording head M. As shown in Fig. 7 the "on" time *t* during which the recording head M is excited, corresponds with the time the electron beam 38 is being swept from one edge of the tape under the head M to the other edge, the narrow off periods between the square pulses indicating that the magnetic head M is not affected during the flyback time *t'*. These square pulses will render the magnetic recording head M operative during the period *t* to expose the moving tape T passing thereunder to a substantially uniform magnetic field of fixed intensity providing a series of striations or transverse exposed paths 65, 66, 67 and 68. These striations or transverse paths represent magnetic exposure areas on the tape and are separated by unexposed portions of lesser width. The tape T will be travelling at a given speed whereby during the lapse of the period *t*, the tape will have moved a distance equal to the thickness of the transverse path 65 and during the flyback time *t'* the tape will have moved a distance equal to the separation of two adjacent transverse paths such as 65 and 66. These different time periods of tape movement are indicated by *t* and *t'* in Fig. 6.

There is provided then, a series of transverse exposed striations or paths on the moving tape T corresponding to the number of scans of the television apparatus employed in televising the program. If the tape is moving at a speed of 60 feet a minute for example, then there will be about 15,750 such striations per foot of tape or about 1,312 lines per inch.

During the period *t* the video television signal is impressed on the grid 40 of the electron gun to modulate the beam 38 and thereby effect modulation of the magnetic field about the beam. This modulated magnetic field will interfere with the magnetic field set up by the recording head M as the beam scans from one end of the head M to the other. Let us suppose for the sake of simplicity that this video signal is representative of the image formed by a capital A. Referring to Fig. 6 such video signal will be represented by a series of light and dark spots along the scan lines in the televising camera. In scan line 61 for example there is shown one dark spot *a*; in scan line 62 there are shown two dark spots *b* and *c*; in scan line 63 there are shown four dark spots *d*, *e*, *f* and *g*; and in scan line 64 there are shown two dark spots *h* and *j* whereby the whole scanned frame represents the capital letter A. The video signal is also represented by the upper wave form in Fig. 7 wherein there is shown a single positive pulse for the first scan, two pulses for the second scan, four positive pulses for the third scan, and two positive pulses for the fourth scan.

Now when this video signal from the televising camera is fed to the grid 40 of the cathode ray tube or electron gun of the recording system, the scanning beam 38 will be increased in intensity when the first pulse corresponding to the dark spot "*a*" is impressed on the grid 40. This increased intensity will cause an increase in the intensity of the magnetic field about the electron beam 38 and will augment the magnetic field 51 under the recording head M to cause a dark spot or a more exposed spot portion to appear on the striation line 65 substantially midway between the edges of the tape T. This further exposed spot is indated *a'* in Fig. 6 on the tape T, the corresponding scanning line of the beam 38 being designated 70.

The next two dark spots *b* and *c* represented by the positive pulses *b* and *c* in the wave form shown in Fig. 7 for the second scan, is similarly impressed on the magnetic tape T by the augmentation of the magnetic field 50 of the beam 38 and the magnetic field 51 of the recording head due to the interference in these fields at two points in the scan. These dark spots are represented by *b'* and *c'* on the scan line 71 of striation path 66 on tape T as also shown in Fig. 6. Similarly the striation paths 67 and 68 with their corresponding modulated scan lines 72 and 73 are shown as including the further exposed points *d'*, *e'*, *f'*, *g'*; and *h'* and *j'* respectively.

From Fig. 7 it is seen that since the sweep wave form 49 is applied to the horizontal deflection plates 42 and 43 of the apparatus shown in Fig. 3 during the time the square wave pulse 48 is applied to the recording head, and since the video signal for that particular scan is similarly applied to the grid 40 of the electron gun during the corresponding period, the representation of the image A is suitably transferred to the magnetic tape T.

Figure 8:
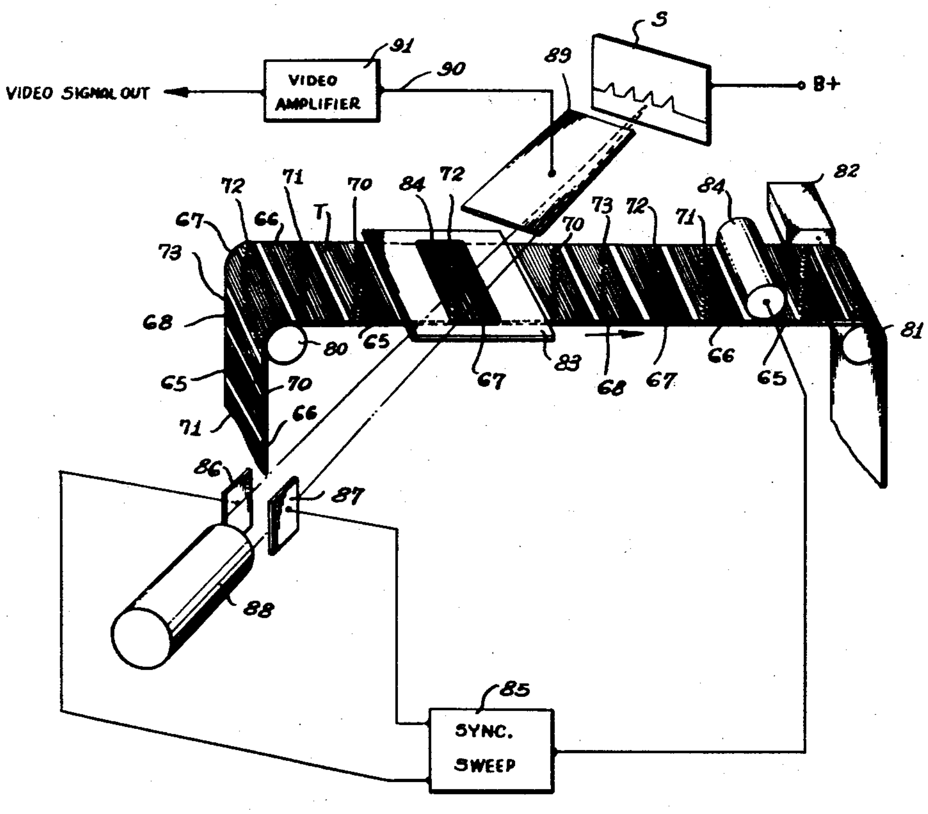
Fig. 8 is a perspective schematic view of a system for reproducing an electrical signal recorded on a magnetic tape in accordance with the invention.

Referring now to Fig. 8 there is shown a system for reproducing the video television signal from the magnetic tape after such tape has been treated in the above described manner. In this system there is provided a pair of stabilizing drums 80 and 81 the latter drum being driven by a suitable synchronous motor 82, to move the tape T at a proper speed. Disposed immediately above the tape T is a shield 83 having a slot 84 of area equal to the area defined by the width and length of any one striation path on the tape thereby permitting just one such striation path to be exposed at a time as the tape is moved under the shield 83. There is also provided immediately above the moving tape, a pickup head 84 connected to a sweep generator 85. Sweep generator 85 provides a sweep voltage for the horizontal deflection plates 86 and 87 of an electron gun 88. The pickup head 84 will send a synchronizing pulse to the generator 85 when a striation path such as 65 or 66 passes thereunder.

The electron gun 88 which is normally surrounded by an evacuated envelope (not shown), is arranged to project a beam of electrical charges parallel to the top surface of the shield 83, the horizontal deflection plates 86 and 87 serving to sweep this beam from one end of the slot 84 to the other. Disposed beyond the moving tape is a collector plate or electrode 89 arranged substantially parallel to the beam whereby any movement of the beam in a vertical direction will be away from or towards this electrode and cause the static charge thereon to vary in accordance with such beam movement. A conductor 90 from electrode 89 is fed to a video amplifier 91 which yields the video output signal. This video output signal is fed to the grid of the usual television set for reproducing the originally televised image.

In the operation of the reproducing system of Fig. 8, the tape T is fed under the shield 83 at a proper speed corresponding to the speed at which the recording of the striation paths 65, 66, etc. took place on the tape; for example, 60 feet per minute. As each scan line such as the lines 70, 71, 72 and 73 in Fig. 6, passes under the slot 84 in shield 83, the electron beam from gun 88 is caused to sweep from one end of the slot to the other and will be deflected in accordance with the intensity of the magnetic field set up by the tape. Thus for example, suppose the striation 67 is passing under the shield 83. As shown in Fig. 6 this striation includes an exposed scan line 72 having four dark spots *d'*, *e'*, *f'*, and *g'* thereon representing the video signal for that scan line. The beam from the electron gun 88 will accordingly be deflected upwardly four times and will modulate the electrical charge content on the deflector plate 89 to provide four pulses spaced in time in accordance with the spacing between the dark spots *d'*, *e'*, *f'* and *g'* on the tape. These pulses are fed along the conductor 90 to the video amplifier 91 and subsequently to a conventional television receiving set. Similarly when the next scan line or scan striation 68 passes under the slot in shield 83, the beam will be deflected upwardly two times to represent the two dark spots and provide two pulses passing from the conductor 90 into the video amplifier 91.

The action of the electron beam from the electron gun 88 may be studied by observing its movement on the screen S which may also serve as the high potential accelerating anode for the electron gun. The reproduction of the video signal may thus be monitored as it takes place.

By the above method and apparatus it will be seen that I have provided a greatly improved system for the recording of television programs on a magnetic tape and for reproducing the same. The principles involved, however, are not to be thought of as limited to this particular application. Thus while a tape type of magnetic-sensitive means is employed in the particular system for recording television signals in order to provide a transverse dimension of sufficient width to enable the video signal to be placed transversely on the tape, in other applications such as the simple transducing or reproduction of an electrical signal, a wire type of magnetic recorder may be used. In such a system for example the wire recording medium may be passed between or through the flux field 25 in Fig. 2 and the modulation of that field by the field 31 about the beam 30 permanently recorded on such wire tape.

Other modifications will occur to those skilled in the art. The invention is, therefore, not to be thought of as limited to the precise embodiments disclosed.

I claim:

1. The method of recording an electrical signal comprising the steps of: producing a beam of electrical charges; modulating said beam with said electrical signal; passing said modulated beam through a given magnetic field whereby the magnetic field about said beam interferes with said given magnetic field to produce a net modulated magnetic field; and exposing a magnetic recording medium to said net modulated magnetic field to record said electrical signal.

2. The method of recording an electrical signal comprising the steps of: producing a beam of electrical charges; modulating said beam with said electrical signal to modulate the magnetic field about said beam; and disposing a magnetic recording medium within said modulated field.

3. The method of recording an electrical signal on a magnetic tape comprising the steps of: exposing said tape to magnetic flux of a given strength; moving a portion of said tape under said flux; directing a beam of electrical charges through said flux adjacent said portion of tape; modulating said beam in accordance with said electrical signal whereby the magnetic field about said beam is modulated and interferes with said magnetic flux of given strength to provide a net modulated magnetic field of flux to which said tape is exposed.

4. The method of reproducing an electrical signal recorded on a magnetic tape in accordance with the method of claim 3 comprising the steps of: moving said magnetic tape past a given point; directing a beam of electrical charges past said point whereby the magnetic field of the tape at said point will interfere with the magnetic field about said beam to alter the direction of said beam; and producing an electrical signal current in response to changes in the direction of said beam.

5. The method of recording a television program on a magnetic tape comprising the steps of: repeatedly producing a magnetic field of fixed strength at a repetition rate equal to the scanning rate utilized in televising said program; passing said magnetic tape through said field; transversely scanning the space between said tape and said field with a beam of electrical charges, the duration of each scan corresponding to the duration of the scan utilized in televising said program; and modulating said beam of electrical charges in accordance with the video signal of said television program whereby the magnetic field about said beam of electrical charges is modulated and interferes with said magnetic field of fixed strength to produce a net modulated magnetic field to which said tape is exposed.

6. The method of reproducing a television program from a magnetic tape on which a program has been recorded in accordance with the method of claim 5, comprising the steps of: passing said tape beneath and in close proximity to a beam of electrical charges; detecting fluctuations in the direction of said beam due to interference between the magnetic field of said tape and the magnetic field about said beam; and reproducing the video television signal in response to said direction fluctuations.

7. An apparatus for recording an electrical signal comprising in combination: a source of electrical charges; means to accelerate said charges to form a beam of electrical charges; means responsive to said electrical signal to modulate said beam of charges and thereby modulate the magnetic field about said beam; means for creating a magnetic field sufficiently close to said beam to be affected by changes in the magnetic field about said beam; and means for passing a magnetic recording medium through the resulting net magnetic field.

8. An apparatus according to claim 7 in which said modulating means comprises a grid in the path of said beam, upon which grid the electrical signal is impressed.

9. An apparatus according to claim 7 in which said modulating means includes an accelerating electrode for said electrical charges upon which electrode said electrical signal is impressed.

10. An apparatus for recording an electrical signal on a magnetic tape comprising: a recording head disposed above said tape and adapted to expose said tape to magnetic flux; means for directing a beam of electrical charges between said recording head and said tape; means for moving said tape; and means for modulating said beam of charged particles in accordance with said electrical signal whereby the net magnetic field to which said tape is exposed is modulated.

11. An apparatus for reproducing an electrical signal recorded on a magnetic tape according to claim 10, comprising means for moving said magnetic tape past a given point; means for directing a beam of electrical charges past said point and within the magnetic field of said tape whereby said field will interfere with the magnetic field about said beam to alter the direction of said beam; a fixed electrode disposed adjacent said beam whereby changes in direction of said beam are towards and away from said electrode thereby modulating the charge content on said electrode; and means responsive to the charge content of said electrode for reproducing said electrical signal.

12. An apparatus for recording a television program on a magnetic tape comprising: a recording head disposed transversely of said tape and adapted to repeatedly expose said tape to magnetic flux at a repetition rate equal to the scanning rate utilized in televising said program; means for moving said tape past said recording head; means for directing a beam of electrical charges between said recording head and said tape; means for scanning said space between the recording head and tape across the width of the tape with said beam at a scanning speed equal to the scanning speed employed in televising said program; and means for modulating said beam in response to the video signal of said television program whereby the magnetic field about said beam of electrical charges is modulated and interferes with said magnetic flux from said recording head to produce a net modulated magnetic flux field to which said tape is exposed.

13. An apparatus for reproducing a television program recorded on a magnetic tape according to claim 12, comprising means for passing said tape past a given area at least equal to the area of tape exposed to one scan of said beam of electrical charges; means for directing a beam of electrical charges past said area; means for scanning said area with said last mentioned beam whereby the variations in magnetic flux across the width of said tape, due to said tape, deflects said beam as it scans across the tape width; an electrode positioned adjacent said beam whereby deflections of said beam are towards and away from said electrode; and means responsive to changes in the charge content of said electrode due to changes in the proximity of said beam for reproducing said video signal.

References Cited in the file of this patent

UNITED STATES PATENTS

| | | |
|---|---|---|
| 2,165,307 | Skellet | July 11, 1939 |
| 2,260,063 | Stone | Oct. 21, 1941 |
| 2,517,808 | Sziklai | Aug. 8, 1950 |
| 2,657,377 | Gray | Oct. 27, 1953 |
| 2,657,378 | Gray | Oct. 27, 1953 |
| 2,698,928 | Pulvari | Jan. 4, 1955 |
| 2,720,558 | Skellett | Oct. 11, 1955 |
| 2,724,021 | Goeppinger | Nov. 15, 1955 |